Figure 1:
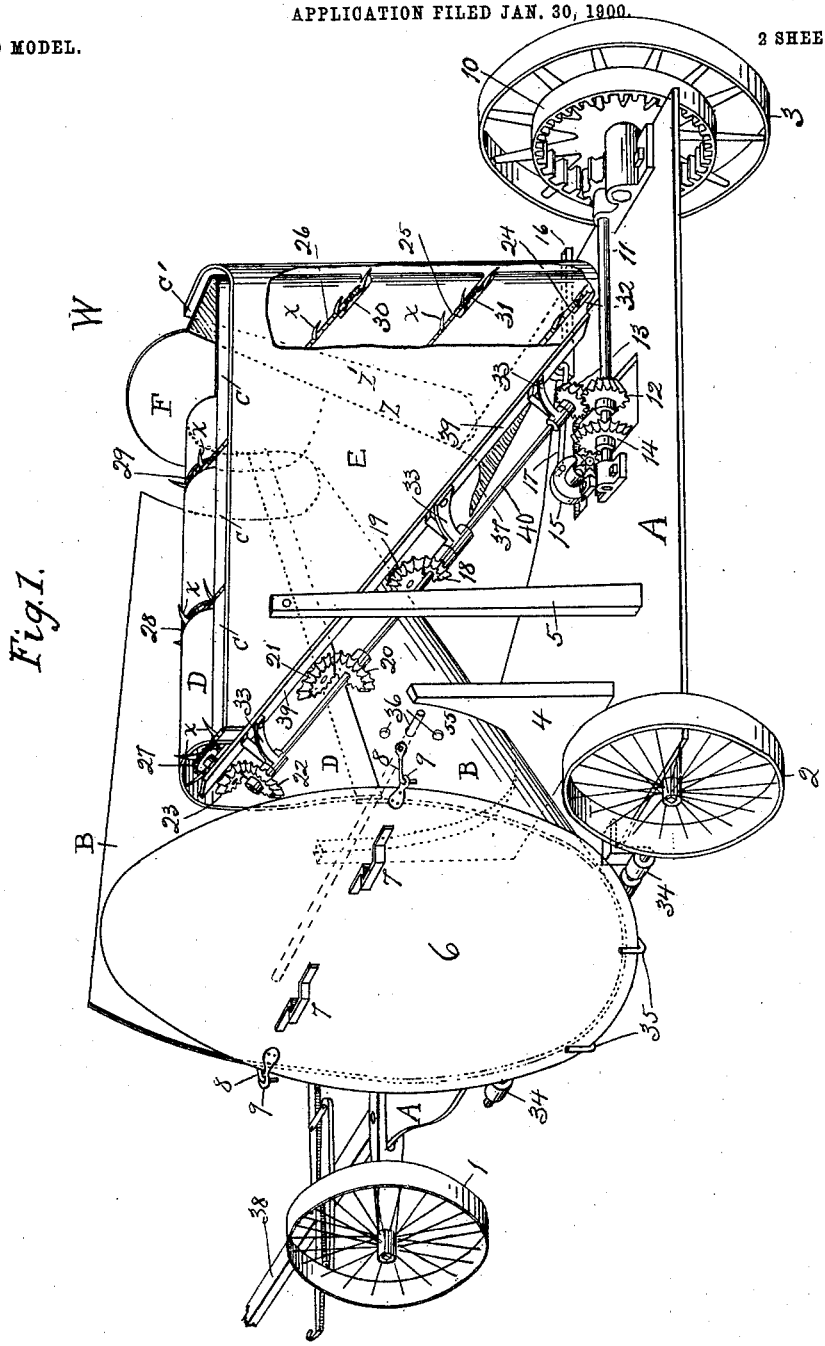

No. 718,919. PATENTED JAN. 20, 1903.
G. T. CROBARGER, DEC'D.
M. E. CROBARGER, ADMINISTRATRIX.
SHOCK CORN HARVESTER.
APPLICATION FILED JAN. 30, 1900.

NO MODEL. 2 SHEETS—SHEET 1.

WITNESSES: INVENTOR,
John C. Nicholson Geo. T. Crobarger.

No. 718,919. PATENTED JAN. 20, 1903.
G. T. CROBARGER, DEC'D.
M. E. CROBARGER, ADMINISTRATRIX.
SHOCK CORN HARVESTER.
APPLICATION FILED JAN. 30, 1900.
NO MODEL. 2 SHEETS—SHEET 2.
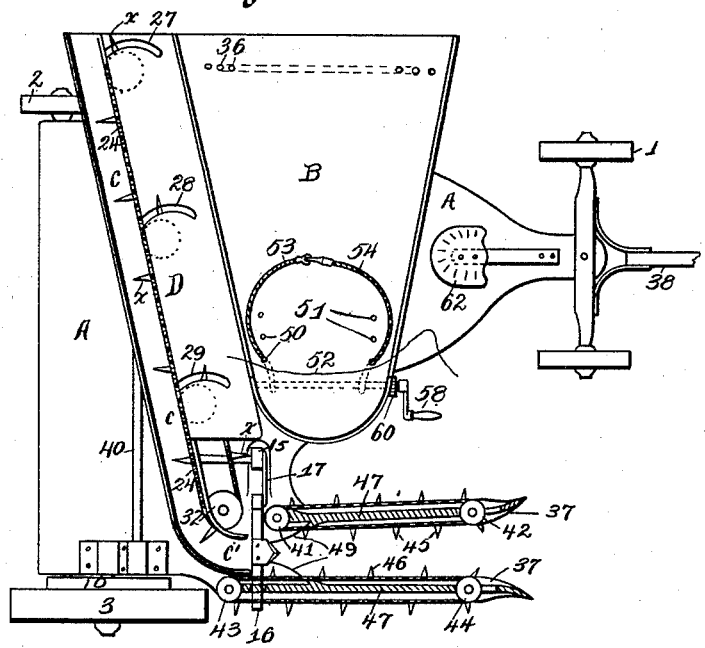
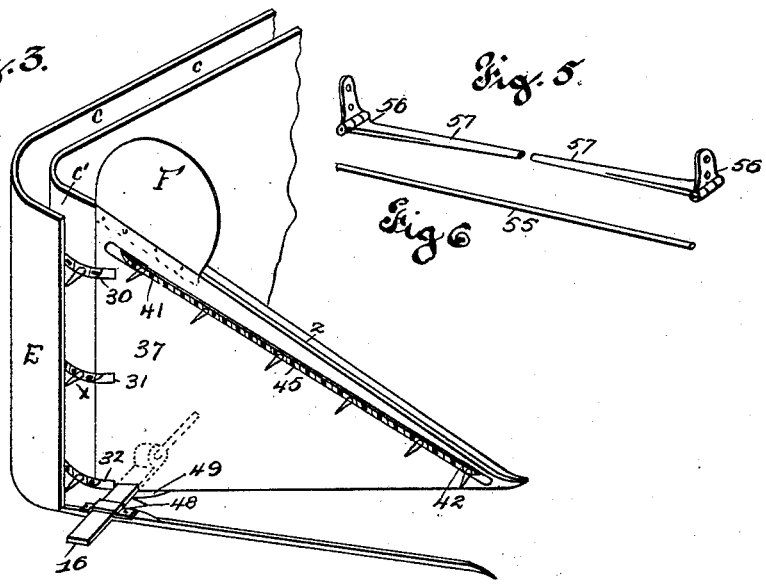

UNITED STATES PATENT OFFICE.

GEORGE T. CROBARGER, OF NEWTON, KANSAS; MARY E. CROBARGER ADMINISTRATRIX OF SAID GEORGE T. CROBARGER, DECEASED.

SHOCK-CORN HARVESTER.

SPECIFICATION forming part of Letters Patent No. 718,919, dated January 20, 1903.

Application filed January 30, 1900. Serial No. 3,270. (No model.)

*To all whom it may concern:*

Be it known that I, GEORGE T. CROBARGER, a citizen of the United States, residing at Newton, in the county of Harvey, in the State of Kansas, have invented certain new and useful Improvements in Shock-Corn Harvesters, of which the following is a specification.

My invention relates to improvements in shock-corn harvesters; and it consists of the novel features herein shown, described, and claimed.

My object is to construct an improved shock-corn harvester for handling stalks which are gathered and cut and then conveyed to the shock-former, where said stalks are tied into a complete shock and the shock set upon the ground and left standing.

Figure 1 is a view in perspective of a corn-harvester embodying the principles of my invention. Fig. 2 is a top plan view of the machine, parts being shown in section. Fig. 3 is a detail perspective of the stalk gatherer and elevator, parts being removed and other parts being broken away. Fig. 4 is a detail perspective of the crank-shaft and pawl and ratchet employed in compressing the shock. Fig. 5 is a view in perspective of the folding bars employed in spreading the base of the shock. Fig. 6 is a view in perspective of a modified form of shock-spreader.

Referring to the drawings in detail, the corn-harvester is mounted on a running-gear, comprising the front wheels 1, the rear wheel 2, and the driving-wheel 3, suitably framed together by the platform A.

The stalk-gatherer mechanism comprises the spreading-points 37, the vertical walls 47, extending backwardly from said points 37, the wheels 41 and 42, mounted at the rear and forward ends, respectively, of the walls 47, the chain connecting said wheels and carrying the gatherer-teeth 45, wheels 43 and 44, mounted at the rear and forward ends, respectively, of the walls 47, the chain carrying the gatherer-teeth 46, running upon said wheels 43 and 44, and the guards 49 at the rear ends of the walls 47. A sickle 16 operates transversely at the rear ends of the walls 47, coöperating with the guards 49 to cut the cornstalks, said sickle being driven by a pitman 15 and a pitman-rod 17. The walls 47 form a perpendicular channel, in which the cornstalks are gathered, and said channel leads to the elevator.

The funnel-shaped shock-former B is pivotally secured at its lower and large end to the platform A by means of the hinges 34, and the hopper reclines loosely upon the rest 4, extending upwardly from the platform when in its normal position and being filled with cornstalks. To hold the stalks in position in the former while the shock is being made, the door 6 is placed in position to close the large end of the former and is held in position by the hooks 35, which support the door at the bottom, and the hooks and eyes 8 and 9, which hold the upper part of the door in position, and said door is provided with operating-handles 7.

The elevator mechanism E conveys the cornstalks from the sickle to the shock-former B, and said mechanism comprises walls forming a narrow triangular channel or chute c, extending transversely of the line of travel and curved forwardly at its deep end to connect with the channel between the walls 47, said channel having an inclined floor 39. The chains 24, 25, and 26, carrying fingers $x$, are mounted a suitable distance apart in planes parallel with the inclined bottom or floor 39, said fingers extending into the channel c as required to carry the cornstalks upwardly. The chain 26 runs at a moderate rate of speed. The chain 25 runs substantially twice as fast, and the chain 24 runs nearly three times as fast, so that whereas the cornstalks are received in a vertical position they are turned to a horizontal position by said chains. The elevator is supported at its deep end upon the platform A and at its shallow end by the post 5. The curved apron D extends horizontally the full length of the shock-former and forms a bridge over which the stalks are carried by the chains 24, 25, and 26 from the channel c into the shock-former B, said fingers $x$, carried by the chains 24, 25, and 26, operating through slots 27, 28, and 29 in said apron D to clean the chains of the stalks as they reach their highest point, permitting the stalks to follow the apron D into the shock-former and allow the chains freed of the stalks to return downwardly between the front wall of the elevator and the apron D, and said apron D forms the top rear side of the shock-former when the shock-former is in its horizontal position, said apron being permanently attached to the elevator and not attached to the shock-former. The elevator-chains 24, 25, and 26 are driven and carried upon the sprocket-wheels 30, 31, and 32 at their lower ends and corresponding wheels at their upper ends.

The driving-shaft 11 is mounted upon the frame A and geared to the driving-wheel 3. Brackets 33, secured to the floor 39, support the shaft 40, and a beveled gear 12 upon the driving-shaft 11 meshes with a beveled gear 13 upon the shaft 40. A crank-disk 15, driven by a beveled gear 14 upon the shaft 11, meshes with the beveled pinion upon the pitman-shaft. A beveled gear 18 upon the shaft 40 meshes with the beveled gear 19 upon a shaft which drives the chain 26. A beveled gear 20 upon the shaft 40 meshes with the beveled gear 21, which drives the chain 25, and a beveled gear 22 upon the shaft 40 meshes with a beveled gear 23, which drives the chain 24. The relative speeds of the chains 24, 25, and 26 are regulated by the relative sizes of the gears 18, 20, and 22 to the gears 19, 21, and 23. A knife 48 is carried by the sickle-bar 16. The pitman 17 connects the sickle-bar 16 with the crank-disk 15. A tongue 38 is employed in guiding the harvester, and the driver's seat 62 is fixed upon the forward end of the platform A.

The crank-shaft 58 is mounted under the upper end of the shock-former B, and ropes 53 and 54 are passed downwardly through the openings 50 and 51 in the shock-former and through openings 61 in the crank-shaft and securely attached to the crank-shaft. A ratchet-wheel 60 is fixed upon the crank-shaft, and a pawl 59 is fixed upon the shock-former to engage the ratchet to hold the crank-shaft from backward motion. A hook upon the end of the rope 54 engages an eye upon the end of the rope 53.

Openings 36 are formed in a vertical row in each side of the shock-former, substantially at the horizontal center, to receive the shock-spreader 55. (Shown in Fig. 6.)

The tie 52 is placed in the shock-former to be used in binding the shock after it has been compressed. When the shock-former has been filled to the desired extent, the ropes 53 and 54 are brought upward and over the shock, and their upper ends are hooked together. The corn-shock is operated to wind up the ropes and to compress the shock to any desired extent, and the pawl and ratchet hold the shock compressed. This operation also binds the shock rigidly to the shock-former. Then the cord 52 is passed around the shock and tied or fastened in any suitable way. The door 6 is removed and the shock-former tipped over with its big end upon the ground, thus setting the shock upon the ground in a vertical position. The compressing-ropes are then released and removed from the shock and the shock left standing alone. The shock-former is then turned back onto the machine, the door 6 readjusted, and the machine moves on.

In harvesting cane, Kafir corn, and the like or in making shocks quite small it is often necessary to spread the butts of the shocks, so that they may stand well pressed upon the ground, or when the corn is cut green the butts should be spread for ventilation. The shock-spreading bar 55 is placed through any desired ones of the openings 36 after one half of the shock has been lifted into the shock-former. Then when the other half of the shock falls into the shock-former the butts will strike the spreading-bar 55, leaving a horizontal wedge-shaped vacancy between the two halves of the shock. After the shock has been placed on the ground the bar 55 is removed. The height of the bar 55 in the holes 36 determines the amount of spread given to the butt of the shock. If desired, the shock-spreader 65 may be substituted for that shown in Fig. 6. Hinge-plates 56 are then attached to the inner faces of the opposite sides of the shock-former near the openings 36, and the spreader-bars 57 swing up and down and inwardly from said hinge-plates. The spreader-bars 57 are swung upwardly against the inner sides of the shock-former until one half the shock has been placed in position. Then said spreader-bars are swung into position and the other half of the shock falls upon said bars. After the shock has been deposited upon the ground the bars 57 are swung downwardly to be removed from the shock. In operation the machine is drawn through the field so that the row of corn will be gathered between the walls 47, and the stalks are cut by the knives 48. Then the stalks will pass through the elevator to the shock-former, and when a desired amount of stalks has been gathered the stalks are tied and deposited upon the ground.

I claim—

1. In a corn-harvester, the combination of a wheel-supported platform, a gatherer, a knife for cutting the corn, a shock-former provided with a stop or butter, spreader-bars, and with compressing devices, and a vertical elevator extending transversely across the machine having an inclined floor, and provided with a series of chains traveling parallel to the inclined floor, and a curved apron, connecting the front top edge of the elevator with the rear top edge of the shock-former, substantially as described.

2. In a corn-harvester, the combination of a wheel-supported platform; a gatherer; a knife for cutting the corn; a shock-former; and a vertical elevator extending transversely across the machine having an inclined floor, and provided with a series of chains traveling parallel to the inclined floor; and a curved apron connecting the front top edge of the elevator with the rear top edge of the shock-former; substantially as specified.

GEORGE T. CROBARGER.

Witnesses:
JOHN C. NICHOLSON,
S. R. PETERS.